Nov. 11, 1969   C. C. ROBINSON   3,477,404
CALL BOARD
Filed Feb. 7, 1968

INVENTOR.
CLIFFORD C. ROBINSON
BY
Wolf, Greenfield & Hieken
ATTORNEYS 3,477,404
CALL BOARD
Clifford C. Robinson, Kansas City, Mo., assignor to Springer Industries, Inc., Mount Vernon, N.Y., a corporation of New York
Filed Feb. 7, 1968, Ser. No. 703,777
Int. Cl. G09f 9/40
U.S. Cl. 116—133                                3 Claims

ABSTRACT OF THE DISCLOSURE

A call board has a vertical panel with a number of circular indicating wheels inside the vertical panel. A portion of each wheel is visible through an indicating window from each side of the panel, the indicating window being below a name holder. A knob attached to the indicating wheel extends through each side of the vertical panel so that the indicating wheel may be set from either side to indicate whether the individual whose name appears in the name holder is in, out or will return at a time indicated in the indicating window.

Background of the invention

The present invention relates in general to call boards and more particularly concerns a novel call board that facilitates indicating the presence, absence or expected time of return of a large number of individuals with structure that occupies a relatively small amount of area per person, clearly indicates the situation of an associated individual from both sides and permits setting the indication from either sde of the call board.

Summary of the invention

According to the invention, the call board comprises means defining a vertical panel. The vertical panel carries a number of indicating wheels supported in openings in the panel that accommodate a shaft attached to the indicating wheel that functions not only to rotatably support the indicating wheel in the panel, but also as a convenient means for adjusting the indicating wheel. Each side of the panel includes a window for displaying a portion of the indicating wheel adjacent to a name holder so that the presence, absence or expected time of return of the individual whose name appears in the name plate holder may be conveniently set and seen from either side of the panel.

Numerous other features, objects and advantages of the invention will become apparent from the following specification when read in connection with the accompanying drawing in which:

Detailed description of preferred embodiments

Figure 1:
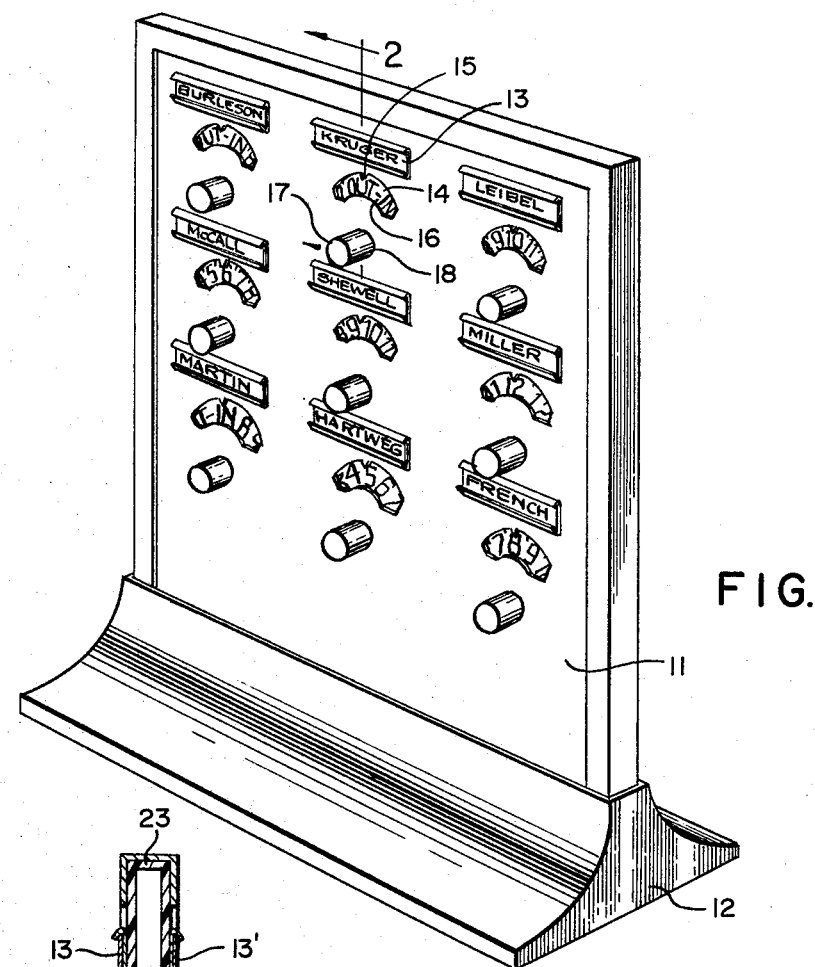
FIG. 1 is a perspective view of a call board according to the invention.

With reference now to the drawing there is shown a perspective view of a call board according to the invention. Although only one side of the call board is shown, the other side is identical. A vertical panel 11 is supported upon a base 12 and compactly carries the means for indicating the presence, absence or expected time of return of nine individuals. Of course, the principles of the invention may be applied to accommodating more or less individuals. The invention still provides the desired indication in an exceptionally small area for each individual while providing an easily observed indication.

The indicating means for each individual comprises a name holder such as 13, a display window such as 14 having an index 15 and an indicating wheel 16 secured upon a shaft such as 18 in vertical panel 11. Shaft 17 also extends through an opening on the other side and functions not only to support indicating wheel 16, but also as a convenient means for adjusting the indication of whether the individual whose name appears in name holder 13 is out, in or is expected to return at a specified time. The other side of the call board contains the same individual names and the same indication as appears on the side visible in FIG. 1.

This arrangement is advantageous because the call board may sit on the desk of a receptionist who may set and observe the appropriate indication for each individual in the office while visitors facing the receptionist also have a complete indication. At the same time, a named individual who enters or leaves the office may set the appropriate indication in the window from the front side of the desk so that the receptionist continuously has an indication of whether an individual is in, out or expected to return at a particular time so that telephone callers may be appropriately informed.

Figure 2:
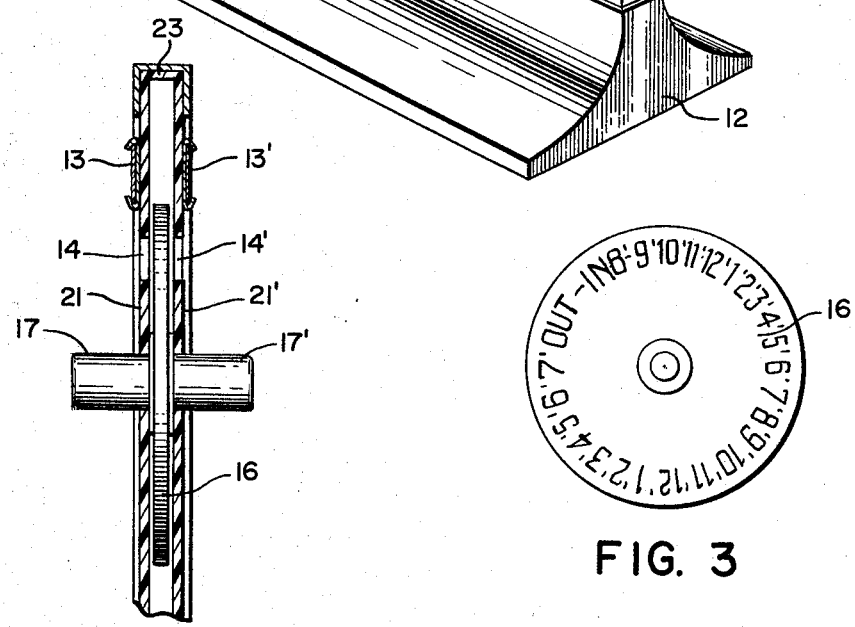
FIG. 2 is a view through section 2—2 of FIG. 1 illustrating the relationship of the indicating wheel to the display window, the name holder and the panel.

Referring to FIG. 2, there is shown a sectional view of the indicating assembly associated with the named individual KRUGER. Corresponding elements on the unseen side of FIG. 1 now visible in FIG. 2 are designated by corresponding reference numerals with an appended prime. With the reference numerals thus indicated and the discussion set forth above, further description of FIG. 2 is unnecessary.

Figure 3:
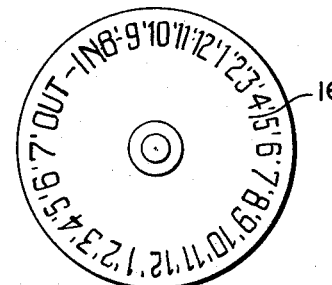
FIG. 3 is a view of a preferred form of indicating wheel in which a complete cycle of indications appears on both halves of the indicating wheel.

Referring to FIG. 3, there is shown a view of a preferred form of indicating wheel 16. Note that this wheel includes a complete cycle of indications embracing IN, OUT and expected times of return from 8 through 7.

As best seen in FIG. 2 the front panel 21 and rear panel 22' may be substantially indentical and joined along a surface 23 substantially midway between. This, fabrication of the invention may be accomplished through assembling a large number of essentially identical parts relatively rapidly and inexpensively.

There has been described a novel call board that facilitates setting and viewing indications of the presence, absence or expected time of return of a large number of individuals in a relatively small space with a compact structure that is economical to fabricate. It is evident that those skilled in the art may now make numerous uses and modifications of and departures from the specific embodiment described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A call board comprising,
   a hollow upright panel,
   a base for supporting said hollow panel substantially in said upright position,
   said upright panel being formed with a plurality of generally circular openings on each saide for supporting a shaft and an arcuate transparent window for displaying a portion of an indicating wheel adjacent to each opening,
   said panel having a name holder adjacent to each of said transparent windows,
   a circular indicating wheel associated with each pair of said circular openings, said transparent windows and said name holders bearing indicia on an outer circular track on each side and mounted with the associated shaft passing through the associated pair of said circular openings so that said shaft comprises means for rotatably supporting the associated indicating wheel and as a means for setting the indication thereof.

2. A call board in accordance with claim 1 wherein said indicia include the designation IN, the designation OUT and a pluralty of numbers arranged in sequence in the order of clock numbers and embracing the clock number 12.

3. A call board in accordance with claim 2 wherein each indicating wheel includes two cycles of said indicia.

References Cited

UNITED STATES PATENTS

| | | | |
|---|---|---|---|
| 549,131 | 11/1895 | James | 116—131 |
| 1,789,890 | 1/1931 | Agrell | 40—70 |
| 1,912,418 | 6/1933 | Vehling et al. | 116—131 |

FOREIGN PATENTS 415,193    9/1946    Italy.

LOUIS J. CAPOZI, Primary Examiner

U.S. Cl. X.R.

40—70; 235—114